E. KRUMLAND.
HAULING ATTACHMENT FOR AUTOMOBILES.
APPLICATION FILED MAR. 27, 1919.
1,353,762.
Patented Sept. 21, 1920.
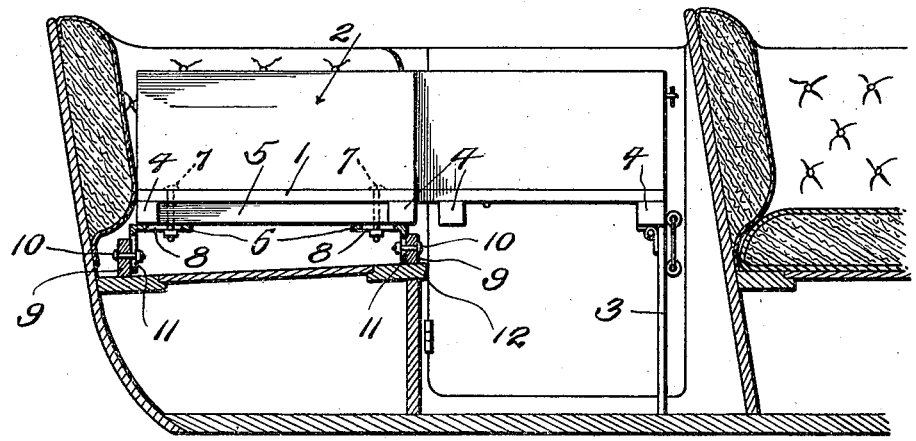
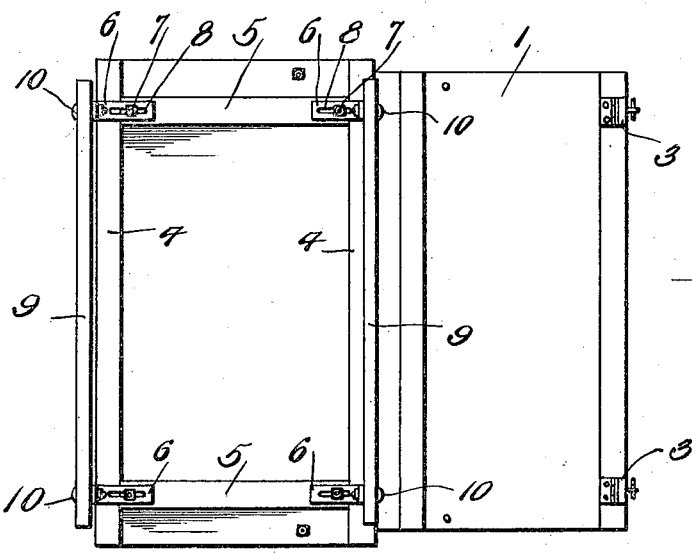
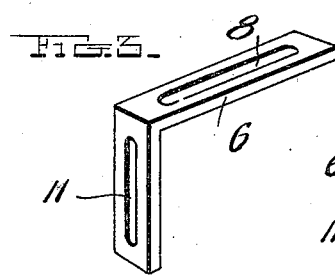
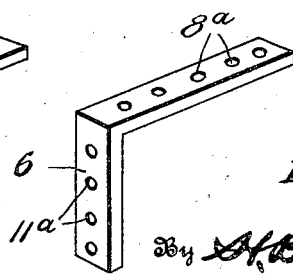
Inventor
E. Krumland,
By A.B. Willson & Co.
Attorneys

UNITED STATES PATENT OFFICE.

EDWARD KRUMLAND, OF COLUMBUS, NEBRASKA.

HAULING ATTACHMENT FOR AUTOMOBILES.

1,353,762.  Specification of Letters Patent.  Patented Sept. 21, 1920.

Application filed March 27, 1919. Serial No. 285,539.

*To all whom it may concern:*

Be it known that I, EDWARD KRUMLAND, citizen of the United States, residing at Columbus, in the county of Platte and State of Nebraska, have invented certain new and useful Improvements in Hauling Attachments for Automobiles; and I do declare the following to be a full, clear, and exact description of the invention, such as will enable others skilled in the art to which it appertains to make and use the same.

My invention has for its object to improve upon the construction disclosed in my United States Patent No. 1284712 of November 12th, 1918, to such an extent as to render the hauling platform applicable to different makes and sizes of automobiles, in which the rear seat frame upon which the platform is in part supported, varies not only in size but is often inclined. I attain this end by the novel construction and arrangement of parts hereinafter fully described and claimed, reference being made to the accompanying drawing.

Figure 1 is a longitudinal section through an automobile body showing the invention applied thereto.

Fig. 2 is a bottom plan view of the platform and the adjustable supporting means therefor.

Figs. 3 and 4 are perspective views showing two forms of brackets which may be used for adjusting the supporting rails of the platform.

In the drawing above briefly described, the numeral 1 designates a platform identical with that disclosed in the patent above referred to, said platform forming the bottom of a box 2 as also disclosed in said patent, and since the structure of this box is fully protected by the patent in question, it need not be described in detail although attention may be directed to the legs 3 which coöperate with the present improvements in supporting the box.

Cleats 4 are secured to the bottom of the platform 1 and extend transversely of the machine, and other cleats 5 may well extend longitudinally between the two rearmost of said cleats 4. L-shaped brackets 6 are adjustably secured by bolts 7 against the lower side of the cleats 4 and also against the cleats 5, if the latter be used, and said brackets may be adjusted forwardly and rearwardly by either providing them with slots 8 as in Figs. 1, 2 and 3, or with spaced bolt holes $8^a$ as illustrated in Fig. 4. A pair of parallel rails 9 are secured by bolts 10 to the vertical arms of the brackets 6 and vertical adjustment of said rails may be effected either by passing said bolts 10 through slots 11 in the brackets as seen in Figs. 1 and 3, or through spaced bolt holes $11^a$ as illustrated in Fig. 4.

Four brackets 6 are preferably used, disposed as shown in Fig. 2, but more may be employed if required, and regardless of the number of brackets, they may be adjusted longitudinally of the platform 1 to properly dispose the rails 9 for contact with the rear seat frame 12, and by means of the bolts 10, the aforesaid rails may be vertically adjusted to substantially level the platform, regardless of the elevation or inclination of the seat frame. This seat frame is of different sizes and differently arranged on numerous sizes and makes of machines, but by employing the adjustable brackets 6 and the rails 9, the platform may be easily adapted to practically any form and size of car.

Since probably the best results are obtained from the details shown and described, they may well be followed, but within the scope of the invention as claimed, numerous minor changes may well be made.

I claim:

In a hauling attachment for automobiles, a platform for disposition in the tonneau of the machine, means for supporting the front end of said platform, L-shaped brackets having one arm secured to said platform for adjustment longitudinally of the same, the other arms of said brackets depending from the platform, and a pair of transverse rails secured to said depending arms for vertical adjustment, whereby they may rest upon different rear seat frames to support the rear end of said platform.

In testimony whereof I have hereunto set my hand.

EDWARD KRUMLAND.